(12) United States Patent
Rediess et al.

(10) Patent No.: US 6,190,094 B1
(45) Date of Patent: Feb. 20, 2001

(54) PNEUMATIC CONVEYING APPARATUS

(75) Inventors: David Rediess, Redford; Eric Kerkmaz, Roseville, both of MI (US)

(73) Assignee: Plastipak Packaging, Inc., Plymouth, MI (US)

( * ) Notice: Under 35 U.S.C. 154(b), the term of this patent shall be extended for 0 days.

(21) Appl. No.: 09/324,240

(22) Filed: Jun. 2, 1999

(51) Int. Cl.$^7$ ................................................. B65G 51/16
(52) U.S. Cl. .............................. 406/19; 406/86; 406/88
(58) Field of Search ................... 406/19, 86, 88

(56) References Cited

U.S. PATENT DOCUMENTS

| | | | |
|---|---|---|---|
| 4,944,635 | * | 7/1990 | Carlier et al. ............................ 406/10 |
| 5,100,265 | * | 3/1992 | Mirkin ...................................... 406/86 |
| 5,147,153 | * | 9/1992 | Aidlin et al. ............................. 406/86 |
| 5,246,314 | * | 9/1993 | Smith et al. .............................. 406/86 |
| 5,542,789 | * | 8/1996 | Aidlin et al. ............................. 406/88 |
| 5,567,091 | * | 10/1996 | Johnson et al. ......................... 406/182 |
| 5,738,467 | * | 4/1998 | Aidlin et al. ............................. 406/86 |
| 5,984,591 | * | 11/1999 | Hilbish et al. ........................... 406/88 |
| 6,000,884 | * | 12/1999 | Ingraham ................................. 406/19 |

* cited by examiner

Primary Examiner—Christopher P. Ellis
Assistant Examiner—Richard Ridley
(74) Attorney, Agent, or Firm—Bachman & LaPointe, P.C.

(57) ABSTRACT

Apparatus includes a pneumatic conveyor for supporting the articles to be conveyed and air under pressure in the conveyor to convey the articles, wherein the conveyor includes a first elongated channel with a first hollow interior volume, a second elongated channel communicating with the first elongated channel and having a second hollow interior volume, with the communication between the first and second elongated channels including openings in the second elongated channel to permit the flow of air under pressure from the first elongated channel to the second elongated channel. Control is provided to control the amount of air flowing through the openings responsive to the density of the population of articles along the conveyor.

12 Claims, 4 Drawing Sheets

PNEUMATIC CONVEYING APPARATUS

TECHNICAL FIELD

This invention relates to an pneumatic conveying apparatus for conveying articles, and more particularly to an improved, controlled-speed air conveyor for transporting hollow articles, such as preforms, bottles and containers.

BACKGROUND OF THE INVENTION

Air conveyors are commonly used for the rapid transport of large numbers of articles, such as plastic articles, between workstations. Such conveyors have a number of advantages over their mechanical counterparts, including their ability to handle containers at much higher speeds.

A typical air conveyor for conveying plastic bottles includes a pair of opposed flanges or guides, positioned apart from one another to form a defined elongated slot. The flanges are commonly covered by a top wall and laterally spaced side walls to form a channel having an inverted U-shaped configuration. A series of louvers positioned on opposing sides of the channel direct pressurized air from a plenum against the articles being conveyed.

For handling purposes, plastic preforms, bottles and containers are often formed with annular rims positioned below their neck finish. When transported by an air conveyor, the finish of the bottles or containers extend upwardly through the slot with their annular rims overlying the spaced flanges. In this manner, the bottles or containers are suspended from the flanges by their annular rims.

In the prior art, much has been done in attempts to control the force of air used to convey the articles at high speeds while at the same time avoiding high-speed impacts and undesirable accumulations, or slugs, of bottles in the system. The air pressure kept in the plenum must be high enough to overcome the friction drag force of a slug should one occur. Modulation of the blower speed is possible, but this requires motor speed control. Unfortunately, the reaction time in depleting the air stored in the plenum as well as replenishing air blown within the plenum is relatively slow in comparison to the more immediate response required in high-speed production lines.

In some cases, those in the art have attempted to position controllable dampers on either side of a fan to restrict the flow of air to a fan. By adjustment of the restriction, the speed of the articles being conveyed can be adjusted. Based upon the relatively infrequent number of spaced fans per foot of track, the control provided by such a method has its own inherent limitations.

In other prior art cases, louvers have been installed in the walls of the plenum in an effort to control the speed of single (random) bottles while applying greater force against the slugs. However, accumulated slugs can occur randomly at any place along a given conveyor span. As such, the complexity of such applications becomes neither economical nor practical.

SUMMARY OF THE INVENTION

It is an object of the present invention to provide a pneumatic conveyor for articles such as bottles, containers and preforms.

It is a further object of this invention to provide an apparatus as aforesaid for improving the control and handling of articles being conveyed by an air conveyor.

Still a further object of this invention is to convey articles at relatively high speed between workstations while minimizing interruption (e.g. sticking or jamming) or damage (e.g. denting or paneling).

Other and further objects of the invention will become apparent from the following detailed description, taken in connection with the accompanying drawings, wherein, by way of illustrative and example, an embodiment of the present invention is disclosed.

In accordance with the present invention a pneumatic conveying apparatus is provided for conveying articles, which comprises: a pneumatic conveyor for supporting the articles to be conveyed; means connected to the pneumatic conveyor to provide air under pressure to the pneumatic conveyor to convey the articles along the pneumatic conveyor; wherein said pneumatic conveyor includes a first elongated channel with a first hollow interior volume, a second elongated channel communicating with said first elongated channel and having a second hollow interior volume, and wherein the communication between the first and second elongated channels includes openings in the second elongated channel to permit the flow of air under pressure from the first elongated channel to the second elongated channel; support means to movably support at least a portion of said articles in said second elongated channel; and control means to control the amount of air flowing through said openings responsive to the density of said articles along said conveyor.

The present invention also comprises an air conveyor which includes an elongated channel with a hollow interior volume having a plurality of louvers; a means to support the articles being conveyed; and a controllable air louver cover (sometimes herein referred to as an "ALC"). Preferably, the channel is comprises of a top wall and a pair of laterally-spaced side walls, while the means to support the articles is comprised of a pair of mutually opposed guides or flanges. The mutually opposed flanges or guides project inwardly into the interior volume of the channel to essentially define an elongated slot. A dual pressure system includes a means to receive and conduct forced air, such as a plenum chamber, and a means to control the movement and position of the ALC. The system additionally includes a plurality of article sensors as well as a programmable logic controller (sometimes herein referred to as "PLC") to regulate forced air input and the operation of the air louver cover.

Further features and advantages of the present invention will appear hereinbelow.

The drawings constitute a part of this specification and include an exemplary embodiment of this invention, which may be embodied in various forms. It is to be understood that in some instances various aspects of the invention may be shown exaggerated or enlarged merely to facilitate an understanding of the invention.

BRIEF DESCRIPTION OF THE DRAWINGS

The present invention will be more readily understandable from a consideration of the accompanying drawings, wherein.

DETAILED DESCRIPTION OF PREFERRED EMBODIMENT

Detailed descriptions of a preferred embodiment are provided herein. It is to be understood, however, that the present invention may be embodied in various forms. Therefore, specific details disclosed herein are not to be interpreted as limiting, but rather as the basis for the claims and as a representative basis for teaching one skilled in the art to employ the present invention in virtually any appropriately detailed system, structure or manner.

Figure 1:
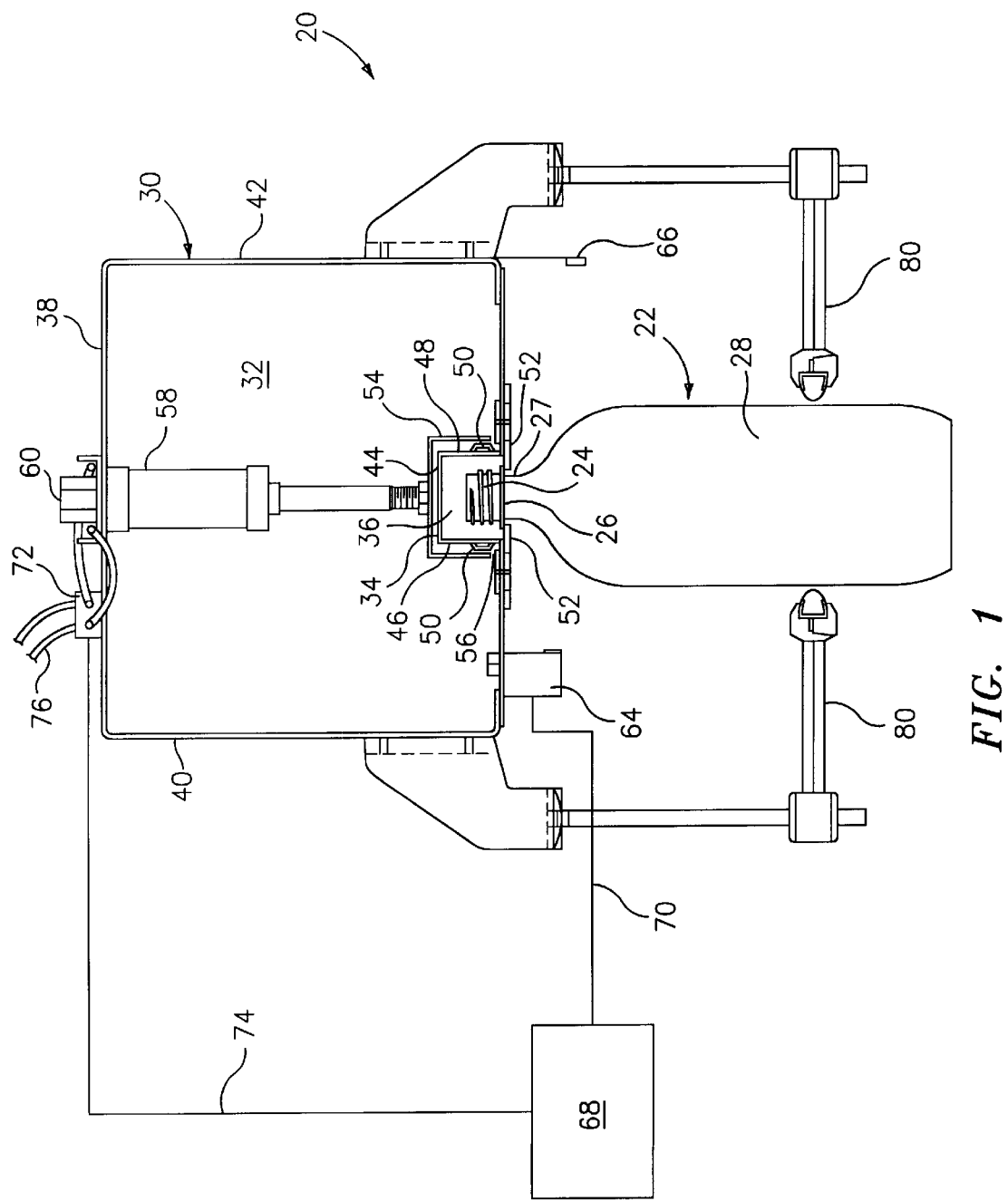
FIG. 1 is a cross-sectional view of a conveyor in accordance with an embodiment of the present invention with the openings adjacent the articles being conveyed permitting a first flow of air to said articles.
Figure 2:
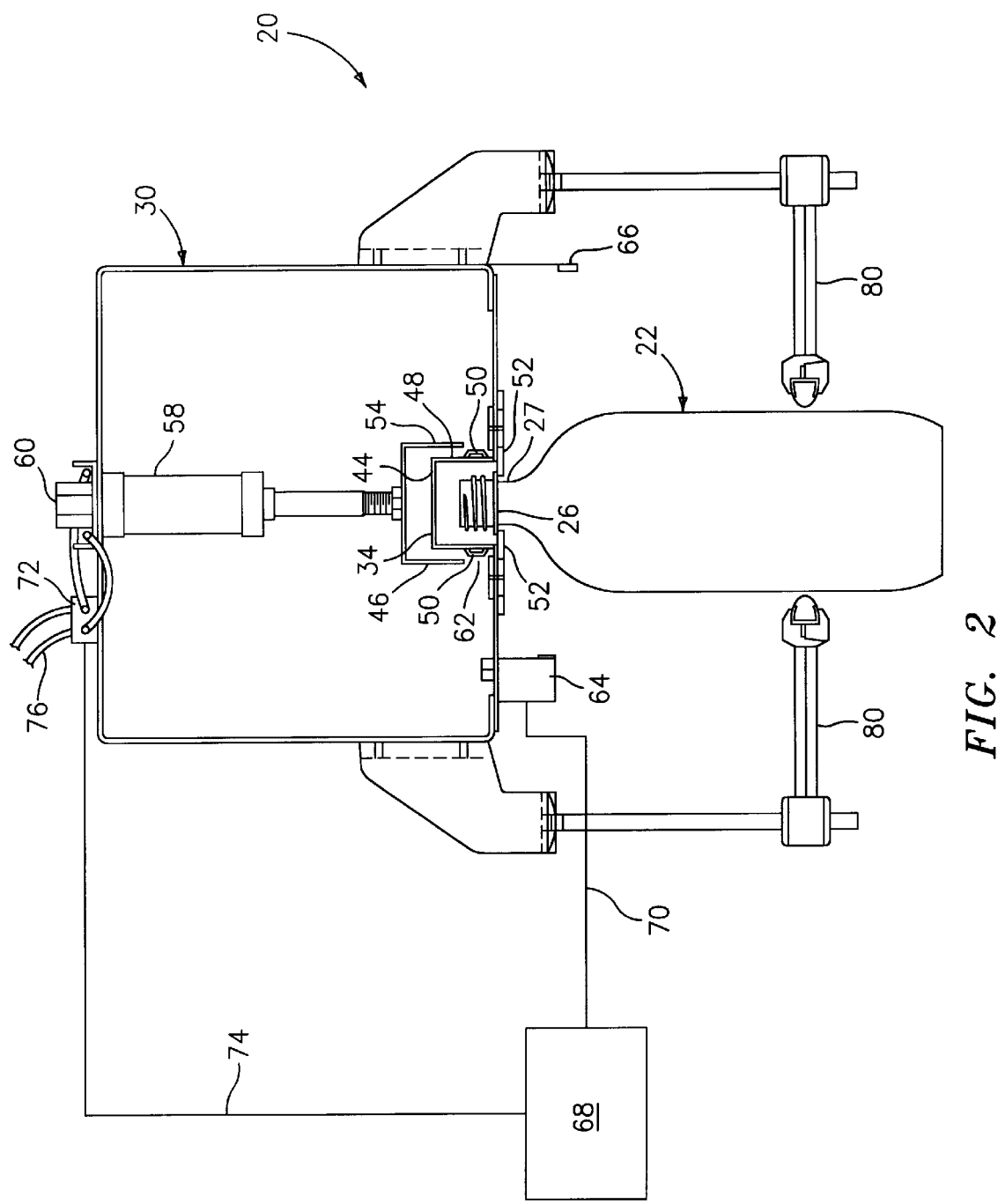
FIG. 2 is a partial cross-sectional view similar to FIG. 1 with the openings adjacent the articles being conveyed permitting a second greater flow of air to said articles.

Referring particularly to FIGS. 1–2, an exemplificative embodiment of a pneumatic conveyor 20 constructed in accordance with the present invention is shown for conveying a plurality of articles 22, such as bottles, containers or preforms. The containers or bottles 22 shown in FIGS. 1–2 include an upper finish portion 24 which desirably includes threads or closure attachment means, an annular neck ring 26 in the form of outwardly extending flanges, a neck portion 27 and a body portion 28.

Conveyor 20 includes a first elongated channel 30 with a first hollow interior volume 32 and a second elongated channel 34 with a second hollow interior volume 36. The first elongated channel 30 includes a first channel top wall 38 extending over the first hollow interior volume 32 and a pair of laterally spaced apart side walls 40, 42 extending along opposite sides of the first hollow interior volume 32. The second elongated channel 34 includes a second channel top wall 44 extending over the second channel hollow volume 36 and a pair of laterally spaced apart side walls 46, 48 extending along opposite sides of the second hollow interior volume 36. Openings or louvers 50 are located in second channel side walls 46, 48 to permit communication between the second hollow volume 36 and the first hollow volume 32. The louvers 50 permit the flow of air under pressure from the first elongated channel 30 to the second elongated channel 34.

Thus, as shown in FIGS. 1–2, the first elongated channel 30 is an inverted U-shaped channel, and the second elongated channel 34 is also an inverted U-shaped channel.

Support means are provided for movably supporting at least a portion of the articles in the second elongated channel. As shown in FIGS. 1–2, these may be mutually opposed laterally spaced flanges or guides 52 which support neck ring 26 so that the bottle finish 24 is in the second elongated channel 34 and the bottle body portion 28 is below the second elongated channel. Thereby, the bottle 22 is free to move along the pneumatic conveyor on guides 52 with the finish portion of the articles being subjected to air pressure in the second hollow volume 36.

However, the invention is not limited to the particular U-shaped configurations. Any desired and appropriate configuration may be used for both the first and second elongated channels such that sufficient air under pressure is contained in the respective channels and that there is sufficient clearance in the second elongated channel for that portion of the articles being conveyed that extend above the flanges or guides 52.

The mutually opposed guides or flanges 52 project inwardly into the second hollow volume 36. In the particular embodiment shown in FIGS. 1–2, the guides extend inwardly in a direction generally perpendicular to side walls 46, 48 to define an elongated slot. In the practice of the present invention the guides or flanges may take on a number of forms or configurations, such as mutually opposed rails. Similarly, the guides may or may not be connected to the second elongated channel 34 or may be included as separate and adjustable components. Adjustable guides may be desirable to accommodate different size bottle neck rings or the like.

Air louver cover 54 is positioned over the second channel side walls 46, 48. In the first position of FIG. 1, which is the normal operating position, the air louver cover essentially covers the louvers 50 so that only a small space 56 is present beneath cover 54 for air pressure to flow from the first hollow volume 32 to louvers 54 to the second hollow volume 36. Cover 54 is connected to rod 58 which is controlled by air cylinder 60. In the position of FIG. 2, cover 54 has been lifted by rod 58 and cylinder 60 from the first position shown in FIG. 1 to a second position so that a larger space 62 is present beneath cover 54 to permit a greater flow of air under pressure to the louvers 54 to the second hollow volume 36. If desired, cylinders may be positioned outside of plenum 32. When the bottle population is such that the bottles are spaced out along the path of flow, the lower air pressure permitted by the first position of the louver cover is sufficient. However, when the bottle density increases, as for example when the bottles are touching, the higher air pressure permitted by the second position of the louver cover allows more rapid bottle movement without damage to the bottles. Naturally, if desired a plurality of louver cover positions may be used to achieve different air flow patterns, and different louver cover designs may be employed to permit different air flow patterns. Photoelectric sensors or electric eye 64 is positioned adjacent bottles 22, including photoeye reflector 66 to determine if the bottle population increases to the point where it is desirable or necessary to raise air louver cover 54 to permit higher air pressure in the second elongated channel 34. The photoelectric sensor 64 is connected to a programmable logic controller (PLC) 68 via line 70 which in turn is connected to a solenoid valve 72 via line 74. The solenoid valve controls air cylinder 60 which lifts air louver cover 54 as previously described from the position shown in FIG. 1 to the position shown in FIG. 2. Naturally, other means may be used to control the movement of the air louver cover responsive to movement of the articles along the conveyor. Air line 76 is provided to supply air to the air cylinder 60.

Figure 3:
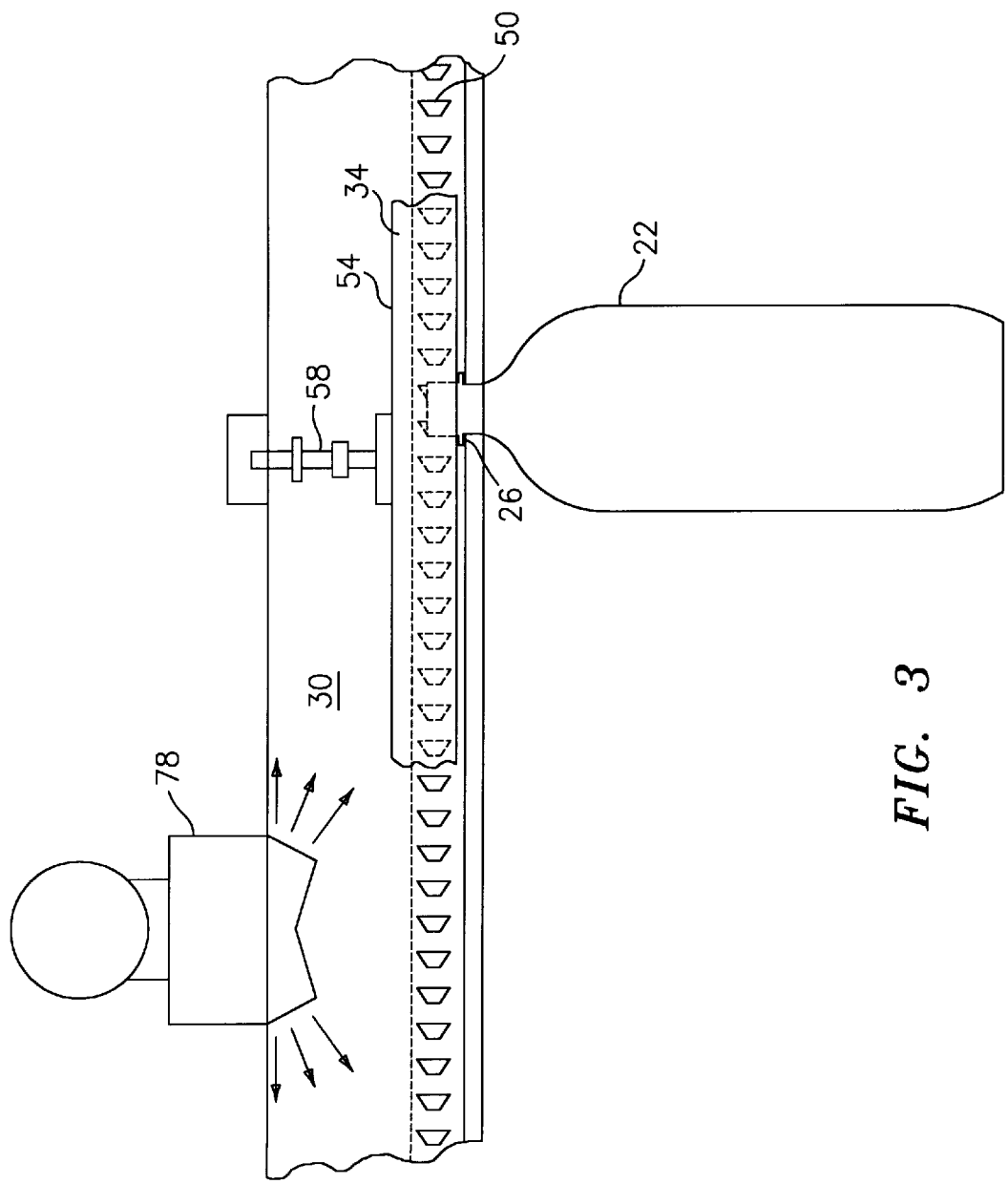
FIG. 3 is a partially broken away side view of the apparatus of the present invention taken along a portion of the length of the air conveyor system.
Figure 4:
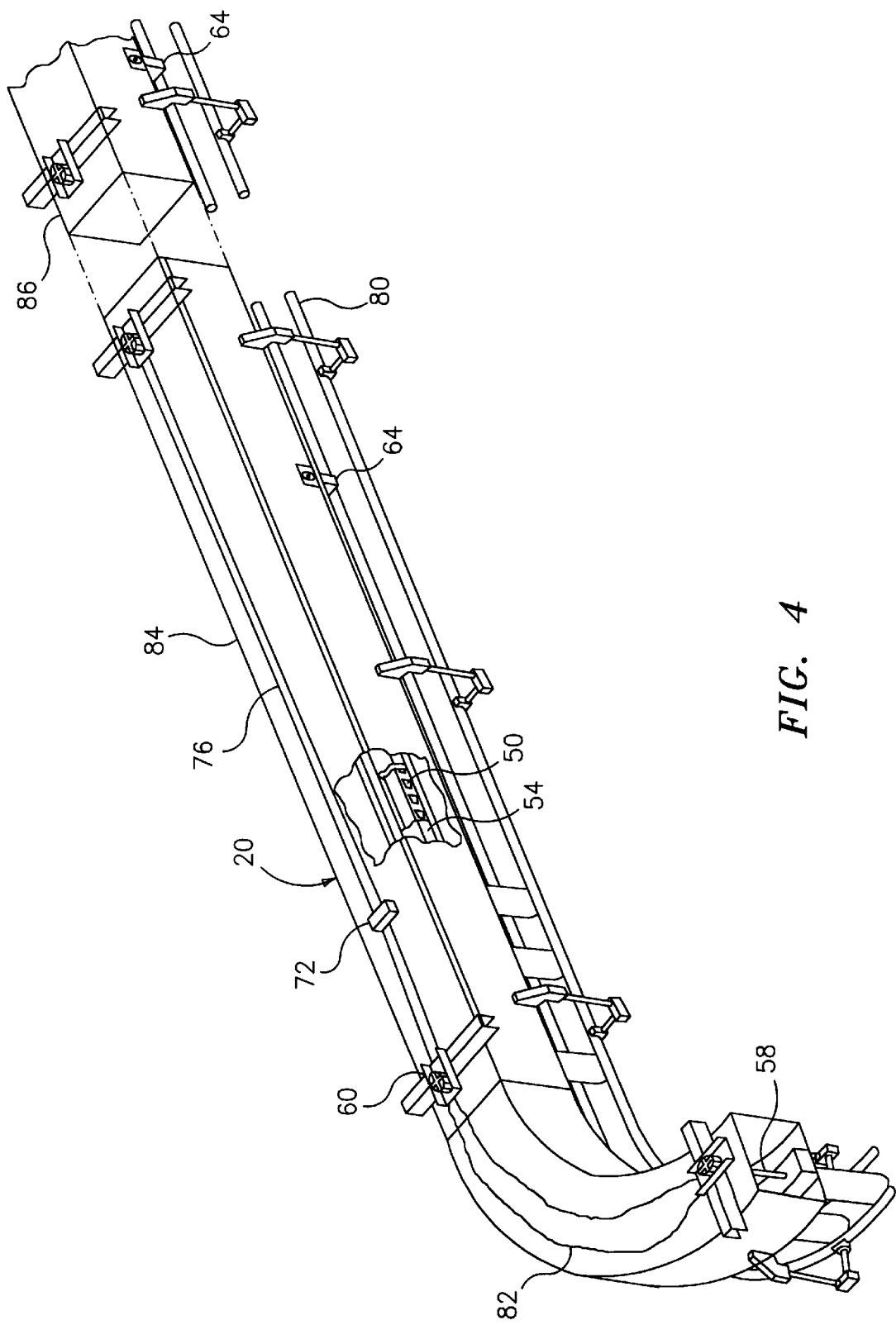
FIG. 4 is a perspective view of the apparatus of the present invention.

As shown in FIGS. 3–4, conveyor 20 is an elongated channel with air under pressure supplied to the first elongated channel or plenum 30 via fan 78. A plurality of fans are normally employed, with the exact number dependent on the length of the conveyor. Bottle guide 80 is provided along the length of the conveyor to maintain vertical orientation of the bottles.

The elongated conveyor 20 desirably includes a plurality of sections 82, 84, 86, etc., with each section separately controlled by a separate photoelectric sensor 64. The separate photoelectric sensors separately determine excess bottle density in separate sections and are operative to selectively control the amount of air under pressure flowing through the louvers in the separate sections as required by means of the PLC 68 raising the air louver cover 54 in the given section only. After the bottle density returns to normal in the given section, this is determined by the sensor which conveys this information to the PLC which in turn lowers the air louver cover 54 in the given section. This can be effectively done in each section when required.

Thus, in accordance with the present invention, a dual pressure system is provided where high pressure is maintained in the air plenum and a low pressure is maintained under the air louver cover which gives one the ability to have a low or high pressure flow in order to influence the speed and attitude of the articles being conveyed. This insures that one article does not strike another to cause damage. At the same time, the perpendicular attitude of the articles is maintained preventing the articles from being stuck on the conveyor. The amount of pressure and air flow required to move the articles at the correct speed and attitude depends on the article population in any particular area of the air conveyor. Articles moving through the system with a reasonable space therebetween require the least amount of air pressure and air flow. However, as the article population increases and the articles move in slugs (slugs being two or more articles in contact with each other as they move). The need for pressure and flow increases depending on the number of bottles in the slug. The photoeye determines when the slugs are large enough to increase the pressure, and this can be programmable depending on particular needs, signals the PLC causing an output to the solenoid valve which signals the air louver cap to raise and thus causes the pressure around the articles to increase. Moreover, this is section by section along the conveyor to provide the increased pressure only where needed.

Still further, the system is completely programmable allowing for interaction both with the blowers or fans and the air louver cover. Also, it is variable with varying size of the articles being conveyed, as with different sized bottles. The system satisfies bottle handling requirements for both bottle manufacturer and bottle filler at the filling plant. For example, a bottle handling objective at the blow molding process is to keep the bottles moving from the blow molder through the secondary processes for accumulation as secondary processes vary in speed, thus assuring that the bottles are always able to leave the blow molder and are available for the secondary processes. The requirement for bottle filling is to keep the conveyor as full as possible in order to insure that the filler has a constant supply of bottles. All of the foregoing is achieved while eliminating or minimizing damage, sticking or jamming in the bottles and while permitting an immediate response to changes in bottle population on a section by section basis on the conveyor. Moreover, the present invention is easy to implement in a commercial operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A pneumatic conveying apparatus for conveying articles, which comprises:
   a pneumatic conveyor for supporting the articles to be conveyed;
   means connected to the pneumatic conveyor to provide air under pressure to the pneumatic conveyor to convey the articles along the pneumatic conveyor;
   wherein the pneumatic conveyor includes a first elongated channel with a first hollow interior volume, a second elongated channel communicating with said first elongated channel and having a second hollow interior volume, with the communication between the first and second elongated channels including openings in the second elongated channel to permit the flow of air under pressure from the first elongated channel to the second elongated channel;
   support means to movably support at least a portion of said articles in said second elongated channel; and
   a movable cover adjacent said openings operative to permit differing amounts of air to flow through said openings, and control means connected to said cover operative to move said cover in relation to said openings and thereby to control the amount of air flowing through said openings responsive to the density of said articles along said conveyor.

2. Apparatus according to claim 1, wherein said means to provide air under pressure includes at least one blower communicating with the first elongated channel.

3. Apparatus according to claim 1, wherein said first elongated channel is an inverted, U-shaped channel, and said second elongated channel is an inverted, U-shaped channel.

4. Apparatus according to claim 3, wherein said first elongated channel includes a top wall and a pair of laterally spaced apart side walls, said first channel walls extending over and along, respectively, the first channel interior volume.

5. Apparatus according to claim 4, wherein said second elongated channel includes a top wall and a pair of laterally spaced apart side walls, said second channel wall extending over and along, respectively, the second channel interior volume.

6. Apparatus according to claim 5, wherein said openings include louvers in said second channel side walls.

7. Apparatus according to claim 6, wherein s aid movable cover is a movable air louver cover operative to permit differing amounts of air to flow through said louvers.

8. Apparatus according to claim 7, wherein said control means is operative to move said air louver cover so that an increased amount of air under pressure flows through said louvers.

9. Apparatus according to claim 8, including a holding means which holds said air louver cover in a first position to permit a first flow of air under pressure to said second elongated channel, and a second position to permit a greater flow of air under pressure to said second elongated channel.

10. Apparatus according to claim 9, wherein said control means includes an electric eye which determines population density of said articles along said conveyor, and wherein said electric eye is operatively connected to said holding means to signal said holding means to move said air louver cover from said first position to said second position.

11. Apparatus according to claim 1, wherein said conveyor includes at least two sections, with each section including a separate control means operative to selectively control the amount of air under pressure flowing through said openings in each section.

12. Apparatus according to claim 1, wherein said articles are containers including an upper finish portion, a neck ring and a body portion, wherein said support means support said neck ring so that the finish portion is in said second elongated channel and the body portion is below said second elongated channel.

* * * * *